United States Patent
Gupta et al.

(10) Patent No.: US 12,163,003 B2
(45) Date of Patent: Dec. 10, 2024

(54) ARTICLES CONTAINING EXPANDED POLY(TETRAMETHYL-p-SILPHENYLENESILOXANE) AND METHODS FOR PRODUCING THE SAME

(71) Applicant: W. L. Gore & Associates, Inc., Newark, DE (US)

(72) Inventors: Ravi Gupta, Newark, DE (US); Guy A Sbriglia, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 54 days.

(21) Appl. No.: 17/916,796

(22) PCT Filed: Mar. 31, 2021

(86) PCT No.: PCT/US2021/025034
§ 371 (c)(1),
(2) Date: Oct. 3, 2022

(87) PCT Pub. No.: WO2021/202628
PCT Pub. Date: Oct. 7, 2021

(65) Prior Publication Data
US 2023/0183437 A1   Jun. 15, 2023
US 2024/0376282 A2   Nov. 14, 2024

Related U.S. Application Data

(60) Provisional application No. 63/004,601, filed on Apr. 3, 2020.

(51) Int. Cl.
*C08J 9/16*   (2006.01)
*C08J 5/18*   (2006.01)
(Continued)

(52) U.S. Cl.
CPC .. *C08J 9/16* (2013.01); *C08J 5/18* (2013.01); *C08J 9/228* (2013.01); *C09J 7/30* (2018.01);
(Continued)

(58) Field of Classification Search
CPC .............. C08J 2205/044; C08J 2207/02; C08J 2383/04; C08J 5/18; C08J 9/16; C08J 9/228; C09J 183/04; C09J 7/30
See application file for complete search history.

(56) References Cited

U.S. PATENT DOCUMENTS 4,518,759 A * 5/1985 Rosenberg ............ C07F 7/0896
528/33
2016/0347997 A1* 12/2016 Tchoul .................. C09K 11/025

FOREIGN PATENT DOCUMENTS

JP    61-192323 A    8/1986
JP    2010-253774 A   11/2010

OTHER PUBLICATIONS

Uehara et al., "Robust and Transparent membrane of Crystalline Silicone via a Melt-Drawing Technique", I. Mater. Chem. C. 2014, 2, 373-381. (Year: 2014).*

(Continued)

*Primary Examiner* — Hai Vo

(57) ABSTRACT

Poly(tetramethyl-p-silphenylenesiloxane) (PTMPS) membranes and porous articles made therefrom that have a matrix tensile strength in at least one direction from about 1 MPa to about 50 MPa, a matrix modulus greater than about 100 MPa in at least one direction, a porosity greater than about 30%, and a microstructure of nodes interconnected by fibrils are provided. The PTMPS polymer forming the PTMPS membranes and porous articles has a crystallinity of at least about 70%, a polydispersity from 1 to 5, and a weight average molecular weight from about 350 kDa to about 5 MDa. The PTMPS membranes may be asymmetric, meaning that the observed pore structure on one side of the (Continued)

PTMPS membrane is different than the pore structure on the opposing side of the PTMPS membrane. Methods of forming porous PTMPS articles are provided. Dense PTMPS articles and methods of making the same are also provided.

17 Claims, 12 Drawing Sheets

(51) Int. Cl.
  *C08J 9/228* (2006.01)
  *C09J 7/30* (2018.01)
  *C09J 183/04* (2006.01)
(52) U.S. Cl.
  CPC ....... *C09J 183/04* (2013.01); *C08J 2205/044* (2013.01); *C08J 2207/02* (2013.01); *C08J 2383/04* (2013.01)

(56) References Cited

OTHER PUBLICATIONS

International Preliminary Report on Patentability received for PCT Patent Application No. PCT/US2021/025034, mailed on Oct. 13, 2022, 8 pages.
International Search Report and Written Opinion received for PCT Patent Application No. PCT/US2021/025034, mailed on Jun. 21, 2021, 9 pages.

* cited by examiner

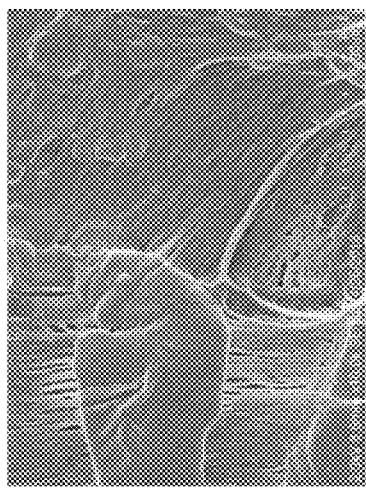
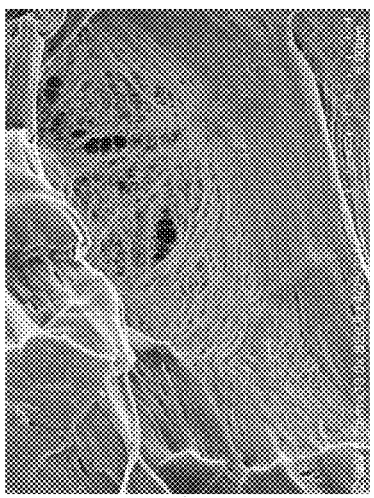

ARTICLES CONTAINING EXPANDED POLY (TETRAMETHYL-p-SILPHENYLENESILOXANE) AND METHODS FOR PRODUCING THE SAME

FIELD

The present invention relates generally to poly (tetramethyl-p-silphenylenesiloxane), and more specifically, to porous articles containing an expanded poly (tetramethyl-p-silphenylenesiloxane) membrane that has a melting point from about 130° C. to about 150° C. and a node and fibril microstructure. Processes for the formation of porous articles and dense articles containing poly (tetramethyl-p-silphenylenesiloxane) polymers are also provided.

BACKGROUND

It is known in the art that microporous fluoropolymer membranes are useful in a variety of applications. Articles made from microporous fluoropolymer membranes possess properties such as toughness, impact strength, low coefficient of friction, and resistance to attack by solvents and corrosive chemicals. Because of the favorable attributes associated with microporous fluoropolymer membranes, microporous fluoropolymer membranes have been utilized in a variety of applications, such as water filtration, dialysis, battery separators, vents, desalinization, and gas separation.

Although articles of microporous fluoropolymer membranes have attractive properties and are used in numerous applications, there has been a recent movement to move away from the use of fluorochemical compounds. Thus, there exists a need in the art for a non-fluoropolymer article that at least demonstrates the positive attributes that fluoropolymers demonstrate. In particular, there exists a need for a process for making a poly (tetramethyl-p-silphenylenesiloxane) article that is processed below the melting temperature, has high strength, high porosity, and high crystallinity.

SUMMARY

According to one aspect, ("Aspect 1"), a poly (tetramethyl-p-silphenylenesiloxane) polymer membrane includes a melting point from about 130° C. to about 150° C., a crystallinity of at least about 70%, a porosity greater than about 30%, and a microstructure of nodes interconnected by fibrils.

According to another aspect, ("Aspect 2") further to Aspect 1, the poly (tetramethyl-p-silphenylenesiloxane) polymer has a crystallinity of at least 70%.

According to another aspect, ("Aspect 3") further to Aspect 1 and Aspect 2, the expanded poly (tetramethyl-p-silphenylenesiloxane) polymer membrane has a porosity greater than about 30%.

According to another aspect, ("Aspect 4") further to any of the preceding Aspects, the expanded poly (tetramethyl-p-silphenylenesiloxane) polymer membrane includes a matrix tensile strength in at least one direction from about 1 MPa to about 50 MPa.

According to another aspect, ("Aspect 5") further to any of the preceding Aspects, the expanded poly (tetramethyl-p-silphenylenesiloxane) polymer membrane has a matrix modulus in at least one direction from about 100 MPa to about 1000 MPa.

According to another aspect, ("Aspect 6") further to any of the preceding Aspects, the expanded poly (tetramethyl-p-silphenylenesiloxane) polymer membrane comprises a poly (tetramethyl-p-silphenylenesiloxane) polymer having a weight average molecular weight from about 350 kDa to 5 MDa.

According to another aspect, ("Aspect 7") further to any of the preceding Aspects, the poly (tetramethyl-p-silphenylenesiloxane) polymer has a polydispersity from 1 to 5.

According to another aspect, ("Aspect 8") further to any of the preceding Aspects, the poly (tetramethyl-p-silphenylenesiloxane) polymer membrane includes at least one comonomer in an amount from about 0.001 mol % to about 10 mol %.

According to another aspect, ("Aspect 9") further to any of the preceding Aspects, the poly (tetramethyl-p-silphenylenesiloxane) polymer membrane comprises at least one filler material.

According to another aspect, ("Aspect 10") further to any of the preceding Aspects, the poly (tetramethyl-p-silphenylenesiloxane) polymer membrane contains therein bioactive moieties.

According to another aspect, ("Aspect 11") further to any of the preceding Aspects, the poly (tetramethyl-p-silphenylenesiloxane) polymer membrane has an asymmetry in pore size from a first side to a second side.

According to another aspect, ("Aspect 12") further to any of the preceding Aspects, the fibrils include polymer chains and the polymer chains are oriented along a fibril axis.

According to another aspect, ("Aspect 13") further to any of the preceding aspects, the fibrils each contain extended chain crystals.

According to another aspect, ("Aspect 14") further to any of the preceding Aspects, the poly (tetramethyl-p-silphenylenesiloxane) polymer article is in the form of a fiber, tube, tape, sheet, or a three dimensional self-supporting structure.

According to another aspect, ("Aspect 15") further to any one of Aspects 1 to 14, a composite includes the poly (tetramethyl-p-silphenylenesiloxane) article.

According to another aspect, ("Aspect 16") further to any one of Aspects 1 to 14 or Aspect 15, a laminate includes the poly (tetramethyl-p-silphenylenesiloxane) polymer article.

According to another aspect, ("Aspect 17") further to any one of Aspects 1 to 14, a device includes the porous poly (tetramethyl-p-silphenylenesiloxane) polymer article.

According to one aspect, ("Aspect 18"), a process for making a poly (tetramethyl-p-silphenylenesiloxane) polymer article includes lubricating a poly (tetramethyl-p-silphenylenesiloxane) polymer having a melting point from about 130° C. to about 150° C. and a crystallinity of at least 70% to form a lubricated poly (tetramethyl-p-silphenylenesiloxane) polymer, subjecting the lubricated poly (tetramethyl-p-silphenylenesiloxane) polymer to pressure at a temperature 60° C. to 140° C. to form a preform, and expanding the preform at a temperature from 60° C. to 140° C. to form a porous poly (tetramethyl-p-silphenylenesiloxane) polymer article having a structure of nodes interconnected by fibrils.

According to another aspect, ("Aspect 19") further to Aspect 18, subjecting includes calendering the lubricated poly (tetramethyl-p-silphenylenesiloxane) polymer at a temperature from 60° C. to 140° C. to form the preform or ram extruding the lubricated poly (tetramethyl-p-silphenylenesiloxane) polymer at a temperature from 60° C. to 140° C. to form the preform.

According to another aspect, ("Aspect 20") further to Aspect 18 and Aspect 19, including removing the lubricant from the preform prior to expanding.

According to another aspect, ("Aspect 21") further to any of the preceding Aspects, the poly (tetramethyl-p-silphenylenesiloxane) polymer has a weight average molecular weight from about from about 350 kDa to 5 MDa.

According to another aspect, ("Aspect 22") further to any of the preceding Aspects, the poly (tetramethyl-p-silphenylenesiloxane) polymer has a polydispersity from 1 to 5.

According to another aspect, ("Aspect 23") further to any of the preceding Aspects, including compressing the porous poly (tetramethyl-p-silphenylenesiloxane) polymer article to form a dense poly (tetramethyl-p-silphenylenesiloxane) polymer article.

According to another aspect, ("Aspect 24") further to any of the preceding Aspects, including adding one of a filler material and a bioactive moiety to the poly (tetramethyl-p-silphenylenesiloxane) polymer.

According to another aspect, ("Aspect 25") further to any of the preceding Aspects, the poly (tetramethyl-p-silphenylenesiloxane) polymer article has an asymmetry in pore size from a first side to a second side.

According one Aspect, ("Aspect 26"), a process for making a poly (tetramethyl-p-silphenylenesiloxane) polymer article includes subjecting a poly (tetramethyl-p-silphenylenesiloxane) polymer having a melting point from 130° C. to 150° C. and a crystallinity of at least 70% to pressure and heat at a temperature from 60° C. to 140° C. to form a preform article followed by expansion of the preform article at a temperature from 60° C. to 140° C. to form a porous poly (tetramethyl-p-silphenylenesiloxane) polymer article.

According to another aspect, ("Aspect 27") further to Aspect 26, poly (tetramethyl-p-silphenylenesiloxane) polymer has a weight average molecular weight from about from about 350 kDa to 5 MDa.

According to another aspect, ("Aspect 28") further to Aspect 26 or Aspect 27, the poly (tetramethyl-p-silphenylenesiloxane) polymer has a polydispersity from 1 to 5.

According to another aspect, ("Aspect 29") further to Aspects 26 to 28, the porous poly (tetramethyl-p-silphenylenesiloxane) polymer article has a porosity greater than about 30%.

According to another aspect, ("Aspect 30") further to Aspects 26 to 29, including compressing the porous poly (tetramethyl-p-silphenylenesiloxane) polymer article to form a dense poly (tetramethyl-p-silphenylenesiloxane) polymer article.

According to one aspect, ("Aspect 31") a process for making a poly (tetramethyl-p-silphenylenesiloxane) polymer article includes casting a poly (tetramethyl-p-silphenylenesiloxane) polymer solution on a substrate to form a poly (tetramethyl-p-silphenylenesiloxane) polymer cast tape, drying the poly (tetramethyl-p-silphenylenesiloxane) polymer tape to form a dried poly (tetramethyl-p-silphenylenesiloxane) polymer cast tape, and removing the microporous poly (tetramethyl-p-silphenylenesiloxane) polymer cast tape from the substrate.

According to another aspect, ("Aspect 32") further to Aspect 31 including expanding the microporous poly (tetramethyl-p-silphenylenesiloxane) polymer cast tape to form an expanded poly (tetramethyl-p-silphenylenesiloxane) membrane having a node and fibril microstructure.

According to another aspect, ("Aspect 33") further to Aspect 31 or Aspect 32, drying includes air drying, vacuum drying, and combinations thereof.

According to another aspect, ("Aspect 34") further any one of Aspects 31 to 33 the poly (tetramethyl-p-silphenylenesiloxane) polymer cast tape has an asymmetry in pore size from a first side to a second side of the microporous poly (tetramethyl-p-silphenylenesiloxane) polymer cast tape.

According to another aspect, ("Aspect 35") further to Aspects 31 to 34, the poly (tetramethyl-p-silphenylenesiloxane) polymer solution includes the poly (tetramethyl-p-silphenylenesiloxane) polymer and an organic solvent.

According to another aspect, ("Aspect 36") further to Aspects 31 to 35, the substrate is a porous or non-porous substrate.

According to another aspect, ("Aspect 37") further to Aspects 31 to 36, the substrate is a non-porous substrate and the non-porous substrate is selected from a glass dish, a glass plate, polytetrafluoroethylene, polyethylene, polypropylene, and polyethylene terephthalate.

According to another aspect, ("Aspect 38") further to Aspects 31 to 37, including cutting the dried poly (tetramethyl-p-silphenylenesiloxane) cast tape to a desired size prior to the expanding.

According to another aspect, ("Aspect 39") further to Aspects 31 to 38, the poly (tetramethyl-p-silphenylenesiloxane) polymer has a crystallinity of at least 70%.

According to another aspect, ("Aspect 40") further to Aspects 31 to 39, the expanded poly (tetramethyl-p-silphenylenesiloxane) polymer membrane has a porosity greater than about 30%.

According to another aspect, ("Aspect 41") further to Aspects 31 to 40, the expanded poly (tetramethyl-p-silphenylenesiloxane) polymer membrane comprises a matrix tensile strength in at least one direction from about 1 MPa to about 50 MPa.

According to another aspect, ("Aspect 42") further to Aspects 31 to 41, the expanded poly (tetramethyl-p-silphenylenesiloxane) polymer membrane has a matrix modulus in at least one direction from about 100 MPa to about 1000 MPa.

According to another aspect, ("Aspect 43") further to Aspects 31 to 42, the poly (tetramethyl-p-silphenylenesiloxane) polymer has a weight average molecular weight from about 350 kDa to 5 MDa.

According one aspect, ("Aspect 44") a process for making a dense article includes feeding poly (tetramethyl-p-silphenylenesiloxane) polymer powder directly into the nip of two calendar rolls to produce a cohesive dense poly (tetramethyl-p-silphenylenesiloxane) tape.

According one aspect, ("Aspect 45") a process includes casting a poly (tetramethyl-p-silphenylenesiloxane) polymer solution on a substrate to form a poly (tetramethyl-p-silphenylenesiloxane) polymer cast tape, submerging the poly (tetramethyl-p-silphenylenesiloxane) polymer cast tape in a non-solvent bath for solvent induced phase separation, removing the poly (tetramethyl-p-silphenylenesiloxane) polymer cast tape from the substrate, and drying the poly (tetramethyl-p-silphenylenesiloxane) polymer cast tape to form a microporous poly (tetramethyl-p-silphenylenesiloxane) polymer cast tape.

According to another aspect, ("Aspect 46") further to Aspect 45, including expanding the microporous poly (tetramethyl-p-silphenylenesiloxane) polymer cast tape to form an expanded poly (tetramethyl-p-silphenylenesiloxane) membrane having a node and fibril microstructure.

According to another aspect, ("Aspect 47") further to Aspect 45 or Aspect 46, including cutting the dried poly (tetramethyl-p-silphenylenesiloxane) polymer cast tape prior to the expanding.

According to another aspect, ("Aspect 48") further to Aspects 45 to 47, the substrate is a porous or non-porous substrate.

According to another aspect, ("Aspect 49") further to Aspects 45 to 48, the substrate is a non-porous substrate and the non-porous substrate is selected from a glass dish, a glass plate, polytetrafluoroethylene, polyethylene, polypropylene, and polyethylene terephthalate.

According to another aspect, ("Aspect 50") further to Aspects 45 to 49, the poly (tetramethyl-p-silphenylenesiloxane) polymer has a crystallinity of at least 70%.

According to another aspect, ("Aspect 51") further to Aspects 45 to 50, the microporous poly (tetramethyl-p-silphenylenesiloxane) polymer cast tape has an asymmetry in pore size from a first side to a second side of the microporous poly (tetramethyl-p-silphenylenesiloxane) polymer cast tape.

According to another aspect, ("Aspect 52") further to Aspects 45 to 51, the expanded poly (tetramethyl-p-silphenylenesiloxane) polymer membrane has a porosity greater than about 30%.

According to another aspect, ("Aspect 53") further to Aspects 45 to 52, the expanded poly (tetramethyl-p-silphenylenesiloxane) polymer membrane comprises a matrix tensile strength in at least one direction from about 1 MPa to about 50 MPa.

According to another aspect, ("Aspect 54") further to Aspects 45 to 53 the expanded poly (tetramethyl-p-silphenylenesiloxane) polymer membrane has a matrix modulus in at least one direction from about 100 MPa to about 1000 MPa.

According to another aspect, ("Aspect 55") further to Aspects 45 to 54, the expanded poly (tetramethyl-p-silphenylenesiloxane) polymer membrane comprises a poly (tetramethyl-p-silphenylenesiloxane) polymer having a weight average molecular weight from about 350 kDa to 5 MDa.

According to one aspect ("Aspect 56"), a poly (tetramethyl-p-silphenylenesiloxane) polymer tape formed from a poly (tetramethyl-p-silphenylenesiloxane) polymer has a crystallinity of at least about 70%, a polydispersity from 1 to 5, and a weight average molecular weight from about 350 kDa to about 5 MDa.

According to another aspect, ("Aspect 57") further to Aspect 56, the poly (tetramethyl-p-silphenylenesiloxane) polymer tape is opaque.

According to another aspect, ("Aspect 58") further to Aspect 56 or Aspect 57, the poly (tetramethyl-p-silphenylenesiloxane) polymer tape was formed utilizing a cast method, a solvent induced cast method, a paste calendering method, or a paste extrusion method.

According to one aspect, ("Aspect 59") an article includes a poly (tetramethyl-p-silphenylenesiloxane) polymer cast tape.

According to another aspect, ("Aspect 60") further to Aspect 59, the poly (tetramethyl-p-silphenylenesiloxane) polymer cast tape has an asymmetry in pore size from a first side to a second side of the poly (tetramethyl-p-silphenylenesiloxane) polymer cast tape.

According to another aspect, ("Aspect 61") further to Aspect 59 or Aspect 60, the poly (tetramethyl-p-silphenylenesiloxane) polymer has a crystallinity of at least 70%.

According to another aspect, ("Aspect 62") further to Aspects 59 to 61, the poly (tetramethyl-p-silphenylenesiloxane) polymer has a weight average molecular weight from about 350 kDa to 5 MDa.

According to one aspect, ("Aspect 63") a process for making a poly (tetramethyl-p-silphenylenesiloxane) polymer article includes lubricating a poly (tetramethyl-p-silphenylenesiloxane) polymer having a melting point from about 130° C. to about 150° C. and a crystallinity of at least 70% with a lubricant to form poly (tetramethyl-p-silphenylenesiloxane) powder/lubricant mixture, and paste extruding the poly (tetramethyl-p-silphenylenesiloxane) powder/lubricant mixture to form a coherent PTMPS bead, tape, tube, or three dimensional self-supporting structure.

According to another aspect ("Aspect 64") further to Aspect 63, including tumbling the poly (tetramethyl-p-silphenylenesiloxane) polymer powder/oil mixture prior to the paste extruding.

According to another aspect, ("Aspect 65") further to Aspect 63 or Aspect 64, including thermal conditioning the poly (tetramethyl-p-silphenylenesiloxane) polymer powder/oil mixture prior to the paste extruding.

According to another aspect, ("Aspect 66"), further Aspects 63 to 65 including expanding the coherent poly (tetramethyl-p-silphenylenesiloxane) polymer bead to form an expanded poly (tetramethyl-p-silphenylenesiloxane polymer membrane According to another aspect ("Aspect 67") further to Aspects 63 to 66, the poly (tetramethyl-p-silphenylenesiloxane) polymer has a weight average molecular weight from about 350 kDa to 5 MDa.

According to another aspect ("Aspect 68") further to Aspects 63 to 67, the poly (tetramethyl-p-silphenylenesiloxane) polymer has a polydispersity from 1 to 5.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

FIG. 3A is a scanning electron micrograph of the biaxially expanded PTMPS membrane of Example 5 showing the presence of a node and fibril microstructure on the glass side of the cast PTMPS membrane in accordance with some embodiments;

FIGS. 3B and 3C are scanning electron micrographs (SEMs) of the biaxially expanded PTMPS membrane of Example 5 showing the presence of a node and fibril microstructure on the air side of the cast PTMPS membrane in accordance with some embodiments;

FIG. 3D is a scanning electron micrograph (SEM) of the cross-section view of the PTMPS membrane of Example 5 in accordance with some embodiments;

DETAILED DESCRIPTION

Persons skilled in the art will readily appreciate that various aspects of the present disclosure can be realized by any number of methods and apparatus configured to perform the intended functions. It should also be noted that the accompanying figures referred to herein are not necessarily drawn to scale, but may be exaggerated to illustrate various aspects of the present disclosure, and in that regard, the figures should not be construed as limiting. It is to be appreciated that the terms "melt temperature", "melting temperature", and melt point may be used interchangeably herein.

The present disclosure relates to poly (tetramethyl-p-silphenylenesiloxane) (PTMPS) membranes and porous articles made therefrom that are processed below the melt temperature of poly (tetramethyl-p-silphenylenesiloxane), have high strength, high porosity, and high crystallinity. The crystallinity of the PTMPS polymer may be measured by differential scanning calorimetry (DSC). Additionally, the PTMPS membranes have a higher and a broader melt temperature from about 130° C. to about 150° C. as compared to PTMPS polymers, which indicate a partial conversion of original lamella crystals into extended chain crystals. In addition, the PTMPS membranes may be asymmetric, meaning that the observed pore structure on one side of the PTMPS membrane is different than the pore structure on the opposing side of the PTMPS membrane. In some embodiments, based on scanning electron microscopy (SEM) of porous PTMPS membrane samples, pore size becomes progressively larger from one side of the PTMPS membrane to the opposing side of the PTMPS membrane.

PTMPS Polymer Formation

Figure 9:
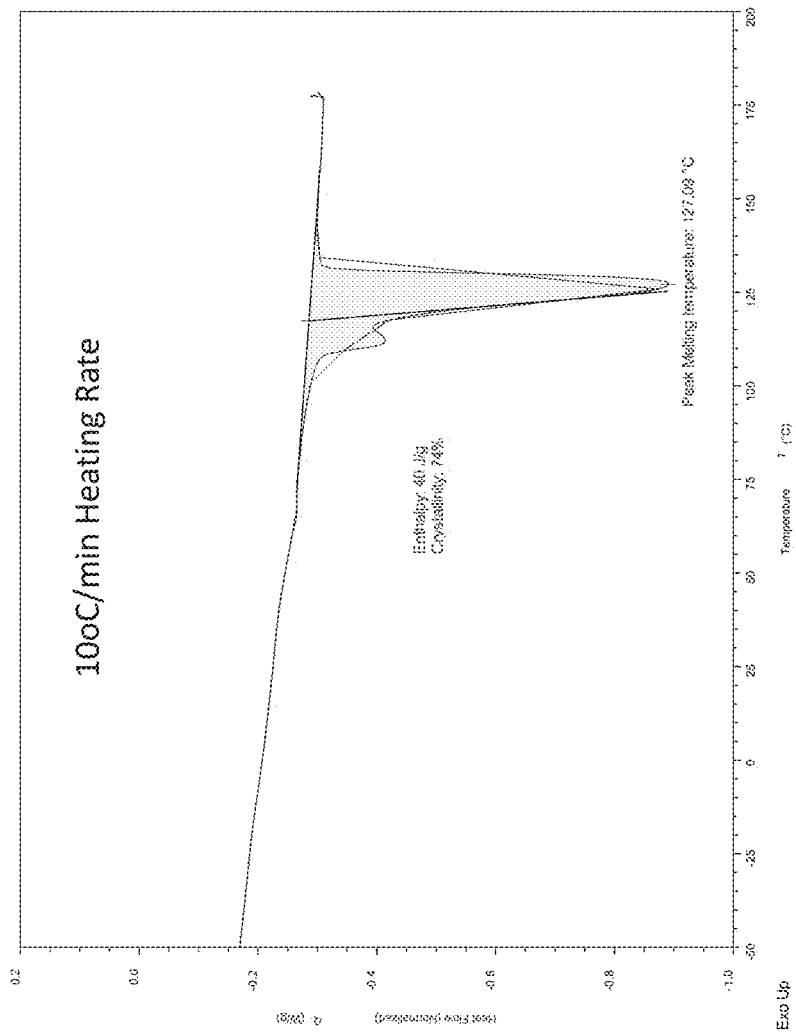
FIG. 9 is a differential scanning calorimetry (DSC) depicting the melting point of the precipitated PTMPS polymer at 127° C. in accordance with some embodiments.

In forming PTMPS polymers, in one embodiment, anhydrous benzene is added to 1,4 Bis(hydroxydimethylsilyl) benzene monomers produced in Example 1 (set forth below) in a jacketed glass reactor to form a reaction mixture. Tetramethylguanidinium bis-2-ethylhexanoate catalyst is added to the reactor while the reaction mixture is heated to an elevated reflux temperature. The reaction mixture is then permitted to reflux. After reflux, the reaction mixture is cooled to 35° C., and poly (tetramethyl-p-silphenylenesiloxane) (PTMPS) polymer is precipitated in methanol. The PTMPS polymer is dried under vacuum. The dried PTMPS polymer has a weight average molecular weight of about 460 kilodaltons (kDa) and a polydispersity of 1.8. The melting point of the precipitated PTMPS polymer is 127° C. based on differential scanning calorimetry (DSC) (see FIG. 9).

In another embodiment, PTMPS polymer may be formed by adding anhydrous benzene to the 1,4 Bis(hydroxydimethylsilyl)benzene monomer as produced in Example 1 in a reactor to make a slurry. Tetramethylguanidinium bis-2-ethylhexanoate catalyst is added to the reactor while the reaction mixture is heated to an elevated reflux temperature. The PTMPS polymer is precipitated at room temperature in methanol and dried under vacuum. The dried PTMPS polymer is characterized using size exclusion chromatography (SEC). The weight average molecular weight of the PTMPS polymer is determined to be 356 kilodaltons (kDa) with a polydispersity of 1.7.

In a further embodiment, PTMPS polymer may be made by adding anhydrous toluene to a 1,4 bis(hydroxy dimethyl silyl)benzene monomer as prepared in Example 11 to make a slurry. 1,1,3,3-tetramethylguanidine catalyst is then added to the reactor while the reaction mixture is heated to an elevated reflux temperature. The PTMPS polymer is precipitated at room temperature in methanol and dried under vacuum. The dried PTMPS polymer is characterized using size exclusion chromatography (SEC). The weight average molecular weight of the PTMPS polymer is determined to be 1 million dalton (1 MDa) with a polydispersity of 2.

In yet another embodiment, PTMPS powder can be produced from the PTMPS polymer. For instance, the PTMPS polymer as produced in Example 2 below may be dissolved in 1,3,5-trimethyl benzene in a jacketed glass reactor. The reactor is maintained at a temperature of 80° C. for 3 hours, after which the reactor is cooled and the reaction mixture is gently stirred. After 24 hours, crystallized particles of PTMPS are visible in the reactor. The PTMPS wet powder is washed with excess methanol and dried to yield a PTMPS powder. The melting point of the PTMPS powder is 129° C. using DSC (see FIG. 10).

Paste Processing PTMPS Polymer Powder

In one embodiment, PTMPS polymer powder may be formed into a microporous article through paste processing of the PTMPS polymer powder. In forming a porous article from a PTMPS polymer powder, the PTMPS polymer powder is first mixed with a lubricant, such as a light mineral oil. Other suitable lubricants include aliphatic hydrocarbons, aromatic hydrocarbons, and the like, and are selected according to flammability, evaporation rate, and economic considerations. It is to be appreciated that the term "lubricant", as used herein, is meant to describe a processing aid that includes (or consists of) an incompressible fluid that is not a solvent for the polymer at the process conditions. The fluid-polymer surface interactions are such that it is possible to create a homogenous mixture. It is also to be noted that that choice of lubricant is not particularly limiting and the selection of lubricant is largely a matter of safety and convenience. It is to be appreciated that any of the lubricants described herein may be utilized as the lubricant so long as the fluid-polymer surface interactions are such that it is possible to create a homogenous mixture. The lubricant may be added to the PTMPS polymer powder in a ratio from about 1 ml/100 g to about 100 ml/100 g or from about 10 ml/100 g to about 70 ml/100 g.

In at least one embodiment, the PTMPS polymer powder and lubricant are mixed so as to uniformly or substantially uniformly distribute the lubricant in the mixture. As used herein, "substantially uniformly" is meant to denote that the powder is distributed as uniformly as possible such that no visible aggregations of powder are seen. It is to be appreciated that various times and mixing methods may be used to distribute the PTMPS polymer powder in the lubricant. In one embodiment, the lubricated PTMPS polymer powder is heated to a point below the melting temperature of the PTMPS polymer powder and above 70° C., which is the solid/state transition of the PTMPS polymer. Sufficient pressure and shear may be applied to form inter-particle connections and create a solid form. Non-limiting examples of solid forms that may be formed without exceeding the melt temperature of the PTMPS polymer include fibers, tubes, tapes, sheets, and three dimensional self supporting structures. Non-limiting examples of methods of applying pressure and shear include paste extrusion (e.g., ram extrusion, calendering, and combinations thereof).

In one embodiment, once the PTMPS polymer powder and lubricant are blended, the PTMPS polymer powder is calendered to produce a cohesive, flexible tape. As used herein, the term "cohesive" is meant to describe a tape that is sufficiently strong for further processing. The calendering occurs at temperatures below the melt point of the PTMPS polymer, such as, for example, at or below about 140° C., or from 60° C. to 140° C., from 75° C. to 130° C., from 80° C. to 125° C., from 90° C. to 120° C., or from 80° C. to 110° C. The tape formed has an indeterminate length and a thickness less than 100 μm. Tapes may be formed that have a thickness from about 10 μm to about 500 μm, from about 15 μm to about 250 μm, or from about 25 μm to about 150 μm. In an alternate embodiment, the lubricated PTMPS polymer powder may be ram extruded to produce a cohesive PTMPS tape.

In a subsequent step, the lubricant may be removed from the PTMPS tape. In instances where a mineral oil is used as the lubricant, the lubricant may be removed by washing the tape in methanol, hexane, or other suitable solvent. The wash solvent is chosen to have excellent solubility for the lubricant and sufficient volatility to be removed below the melting point of the PTMPS polymer. If the lubricant is of sufficient volatility, the lubricant may be removed without a washing step, or it may be removed by heat and/or vacuum. The PTMPS tape is then optionally permitted to dry, typically by air drying. However, any conventional drying method may be used as long as the temperature of heating the PTMPS tape remains below the melting point of the PTMPS polymer.

The tapes, once dried, may be cut to suitable sizes for expansion. Expansion of the samples occurs at temperatures below the melt temperature of the PTMPS polymer. In some embodiments, the samples are expanded at temperatures from 60° C. to 140° C., from 75° C. to 130° C., from 80° C. to 125° C., from 90° C. to 120° C., or from 80° C. to 110° C. The samples may be expanded in one or more directions (i.e, uniaxially or biaxially) to form a porous (e.g., microporous) PTMPS membrane. Any biaxial expansion of the PTMPS tapes may occur either sequentially or simultaneously. Expansion, either uniaxial or biaxial, may be conducted at rates from about 0.1%/s to about 1000%/s, from about 1%/s to about 500%/s, or from about 10%/s to about 100%/s. The porous microstructure of the expanded membrane is affected by the temperature and rate at which it is expanded. The geometry of the nodes and fibrils can be controlled by the selection of PTMPS polymer, the rate of expansion, temperature of expansion, and/or the total amount of expansion. The tapes are also suitable for continuous processing, such as, for example, into a porous PTMPS article. In addition, the porous PTMPS polymer membrane may be compressed to form a dense poly (tetramethyl-p-silphenylenesiloxane) polymer article having a porosity of 10% or less.

Cast Methods for Forming a Porous PTMPS Article

In at least one embodiment, the PTMPS polymer may be formed into a microporous article by a cast method. In some embodiments, a PTMPS polymer formed as described above is placed into solution with an organic solvent, such as p-xylene, to make a desired wt % PTMPS solution. As one example, p-xylene may be added to the PTMPS polymer to make a 1% solution, a 3% solution, a 5% solution, a 7% solution, a 10% solution, a 12% solution, a 15% solution, a 17% solution, or a 20% solution ("PTMPS solution"). Other non-limiting examples of suitable organic solvents for use herein include toluene, tetrahydrofuran (THF), and xylenes. In one cast process, the PTMPS solution is cast or placed on a non-porous substrate such as a glass dish or plate and allowed to air dry. Once air dried, the PTMPS cast tape is peeled from the non-porous substrate (e.g., glass dish) and further dried under vacuum. Other suitable non-porous substrates that may be used to form the PTMPS cast tape include, but are not limited to, polytetrafluoroethylene (PTFE), polyethylene, polypropylene, and polyethylene terephthalate (PET).

As one instance, a PTMPS solution, such as described above, may be cast on a non-porous substrate such as a glass plate, or alternatively onto a porous substrate, to form a wet tape. The PTMPS wet tape is then submerged into a nonsolvent such as isopropanol (IPA) or methanol for solvent-induced phase separation, which forms a PTMPS cast tape. It is to be appreciated that any non-solvent to PTMPS which is miscible with the solvent used for making the PTMPS solution may be used in the cast process. The result of the solvent-induced phase separation is an opaque PTMPS tape, which may be peeled from the porous or non-porous substrate (e.g., glass plate). The PTMPS cast tape may then be air dried to remove any residual solvent.

The PTMPS cast tapes may be cut to suitable sizes for expansion. Expansion of the cast tapes occurs at temperatures below the melt temperature of the PTMPS polymer. In some embodiments, the PTMPS cast tapes are expanded at temperatures from 60° C. to 140° C., from 75° C. to 130° C., from 80° C. to 125° C., from 90° C. to 120° C., or from 80° C. to 110° C. The PTMPS tapes may be expanded in one or more directions (i.e, uniaxially or biaxially) to form a porous PTMPS membrane. Expansion, either uniaxial or biaxial, may be conducted at rates from about 0.1%/s to about 1000%/s, from about 1%/s to about 500%/s, or from about 10%/s to about 100%/s. The biaxial expansion may occur sequentially (i.e., the machine direction and transverse direction expansion is conducted separately) or simultaneously (i.e., the machine direction and transverse direction expansion is conducted at the same time). When the PTMPS tape is expanded, the expanded PTMPS membrane has a node and fibril structure. Node, as defined herein, is meant to describe the connection point of at least three fibrils. The porous microstructure of the expanded PTMPS membrane is affected by the conditions of the tape forming process (e.g., the solvent used, the rate at which the tape was dried, the concentration of the polymer in solution, the substrate used, etc.).

The expanded PTMPS polymer articles (e.g., expanded PTMPS membranes) made in accordance with the processes described herein have a matrix tensile strength in at least one direction from about 1 MPa to about 50 MPa, from about 10 MPa to about 50 MPa, from about 20 MPa to about 50 MPa, from about 30 MPa to about 50 MPa, or from about 40 MPa to about 50 MPa. In addition, the expanded PTMPS articles have a matrix modulus in at least one direction greater than about 100 MPa, greater than about 250 MPa, or greater than about 500 MPa, or up to and including 1000 MPa. The matrix modulus of the expanded PTMPS polymer articles may range from about 100 MPa to about 1000 MPa, from about 200 MPa to about 1000 MPa, from about 300 MPa to about 1000 MPa, from about 400 MPa to about 1000 MPa, from about 500 MPa to about 1000 MPa, from about 600 MPa to about 1000 MPa, from about 700 MPa to about 1000 MPa, from about 800 MPa to about 1000 MPa, or from about 900 MPa to about 1000 MPa.

In addition, the expanded PTMPS polymer articles have a percent porosity that is greater than about 30%, greater than or equal to about 35%, greater than or equal to about 40%, greater than or equal to about 45%, greater than or equal to about 50%, greater than or equal to about 55%, greater than or equal to about 60%, greater than or equal to about 65%, greater than or equal to about 70%, greater than or equal to about 75%, greater than or equal to about 80%, greater than or equal to about 85%, or greater than or equal to about 90%. In some embodiments, the PTMPS polymer articles may have a percent porosity from about 30% to about 90%, from about 40% to about 90%, from about 50% to about 90%, from about 60% to about 90%, from about 70% to about 90%, or from about 80% to about 90%.

The PTMPS polymers have a high crystallinity. As used herein, the phrase "high crystallinity" is meant to include PTMPS polymers that have a crystallinity of at least 70% as determined by DSC. The PTMPS polymers may have a crystallinity of at least 75%, at least 80%, at least 85%, at least 90%, or at least 95%. Alternatively, the PTMPS polymer may have a crystallinity from about 70% to about 95%, from about 80% to about 95%, from about 85% to about 95%, or from about 90% to about 95%. In addition, the PTMPS polymers have a weight average molecular weight from about 350 kDa to about 5 MDa, from about 800,000 kDa to about 5 MDa, or from about 1.5 MDa to about 5 MDa.

As discussed herein, the PTMPS polymer articles have a node and fibril microstructure. With reference to the PTMPS polymers and PTMPS articles described herein, a node may be described as a larger volume of polymer, and is where a fibril originates or terminates with no clear continuation of the same fibril through the node. The node is also the connection point of at least 3 fibrils. In at least one embodiment, the PTMPS polymer chains are oriented along a fibril axis. The PTMPS membranes have a broad melting point from 135° C. to 150° C., indicating a partial conversion of original lamella crystals into extended chain crystals. The higher melt temperature of the PTMPS polymer (e.g., from 135° C. to 150° C.) represents the extended chain crystals. In addition, each fibril contains extended chain crystals, as evidenced by the DSC curve shown in FIG. 12.

In addition, the PTMPS polymer may contain at least one additional comonomer, thereby forming a modified PTMPS polymer. Suitable comonomers that may be included in the PTMPS polymer include, but are not limited to, m-bis (dimethylhydroxysilyl) benzene, o-bis (dimethylhydroxysilyl) benzene or comonomers having the Formula I. Comonomer(s) may be present in the copolymer in an amount greater than about 0.001 mol %, greater than about 1 mol %, greater than about 5 mol %, greater than about 10 mol %, greater than about 15 mol %, or greater than about 20 mol %. It some embodiments, the comonomer(s) may be present in the copolymer in an amount from about 0.001 mol % to about 30 mol %, from about 0.001 mol % to about 25 mol %, from about 0.001 mol % to about 20 mol %, from about 0.001 mol % to about 15 mol %, or from about 0.001 mol % to about 10 mol %, from about 0.01 mol % to about 5 mol %, or from about 0.1 mol % to about 1 mol %.

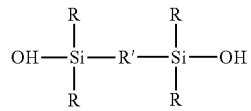

Formula I where R and R' belong to $C_1$ to $C_6$ alkyl or aromatic groups, such as aromatic groups containing phenyl ring(s).

In a further embodiment, a dense PTMPS polymer article is provided. The dense PTMPS article may be formed by compressing a porous PTMPS polymer membrane with or without the addition of heat (but remaining below the melting point of the PTMPS polymer). Pressure may be added via calendering, or plate pressing. In another embodiment, PTMPS polymer powder may be directly calendered (i.e., PTMPS polymer powder may be fed directly into the nip of two calendar rolls) to produce a cohesive dense tape. The dense tape formed has an indeterminate length and a thickness less than about 1 mm. The dense tape may be continuously processed or may be cut to suitable sizes for expansion. Expansion of the dry dense tape occurs at temperatures below the melt temperature of the PTMPS polymer and above 70° C., which is the solid/state transition of the PTMPS polymer. The expansion, either uniaxial or biaxial, may be conducted at rates from about 0.1%/s to about 1000%/s, from about 1%/s to about 500%/s, or from about 10%/s to about 100%/s. It is to be understood to one of skill in the art that various times, temperatures, and pressures may be utilized to achieve a densified article.

The incorporation of filler materials and/or coatings in or on the PTMPS polymer articles described herein are considered to be within the purview of the invention. For instance, a filler material may be blended with a PTMPS polymer before calendaring or ram extruding (and optionally expansion), or may be positioned on the PTMPS polymer article and locked in place with a suitable hydrogel. Non-limiting examples of suitable filler materials include inorganic materials (e.g., silica), carbon black, aerogels, metals, semi-metals, ceramics, carbon/metal particulate blends, activated carbon, hydrogel materials, bioactive substances, stiffening agents, and combinations thereof. Filler materials may be incorporated into the PTMPS polymer article in amounts from about 1.0% to about 80%, or from about 20% to about 60%, or from about 1% to about 30% by weight of the PTMPS article. Alternatively, suitable non-reactive filler materials may be incorporated into the PTMPS polymer articles during the formation of the PTMPS polymer.

Various components can be co-processed with or placed on and/or within the PTMPS articles. In particular, components (or chemical compositions) may be added to the PTMPS polymer either during or after polymer synthesis in such a manner that the added component(s) become intimately mixed in the polymer, such as in a blend or as a covalently bonded component of the PTMPS polymer chain. The added components could alternatively, or additionally, be placed outside the polymer on surfaces of the fibrils of the expanded PTMPS polymer. Further, the components may be placed within void spaces (e.g., pores) or between the fibrils in the expanded PTMPS article. The components added to or within the PTMPS article may be absorbable or non-absorbable. The added compositions can include useful substances that are releasably contained therein. Non-limiting examples of components that may be added or otherwise included in the PTMPS polymer or PTMPS article include cells, viruses, viral vectors, bacteria, proteins, antibodies, and other bioactive moieties.

Advantages of porous PTMPS membranes described herein include creep resistance, ease of processing with wide a range of temperature, solvents and concentrations, and radiation resistance (e.g., Gamma radiation). In addition, the PTMPS membranes are free of fluorocarbons. Unlike other types of silicone substrates, PTMPS membranes have a high matrix module and matrix tensile strength without the need for cross-linking.

Test Methods

It should be understood that although certain methods and equipment are described below, other methods or equipment determined suitable by one of ordinary skill in the art may be alternatively utilized. It is to be understood that the following examples were conducted on a lab scale but could be readily adapted to a continuous or semi-continuous process.

Differential Scanning Calorimetry (DSC)

DSC data were collected using a TA Instruments Discovery DSC between −50° C. and 160° C. using a heating rate of 10° C./min. For resin samples, approximately 5 mg of powder was placed into a standard pan-and-lid combination available from TA instruments. The membrane samples were prepared by punching 4 mm disks. The 4 mm disk was placed flat in the pan and the lid was crimped to sandwich the membrane disk between the pan and lid.

Scanning Electron Micrographs (SEM)

The SEM samples were imaged at 1.0 to 10 KV using an Hitachi SU 8000 Field Emission scanning electron microscope with mixed Upper and Lower Second Electron detectors.

Average Thickness Measurements

Thickness was measured by placing the sample between the two plates of a Miyutoyo thickness gauge (Miyutoyo Corporation, Kawasaki, Japan). The average of three measurements was reported.

Matrix Tensile Strength and Matrix Modulus

Matrix tensile strength and matrix modulus were measured by measuring stress response to a constant uniaxial displacement rate using an Axial Test on a Dynamic Mechanical Analyzer (DMA) (Model: RSA-G2 manufactured by TA Instruments-Waters LLC, New Castle DE USA). Rectangular-shaped specimen of the membranes were die cut with a width of 4.7 mm. The DMA was accessorized with a Film/Fiber Tension clamps. The clamps gap was referenced at the same test conditions of room temperature. A prepared specimen was mounted on the DMA clamps with a sample length/gap at 10 mm. The Axial test consists of applying a constant displacement rate of 0.1 mm/s for a maximum duration of 200 seconds and measuring the corresponding transient axial force. For longitudinal MTS measurements, the larger dimension of the sample was oriented in the expansion direction, which was designated the "machine direction". For the transverse MTS measurements, the larger dimension of the sample was oriented perpendicular to the expansion direction, which was designated the "transverse direction".

Matrix tensile strength was calculated using the following equation:

MTS=(maximum stress/cross-section area)·(Skeletal density of PTMPS)/density of the sample), where the true/skeletal density of PTMPS was taken to be 1.025 g/cc as measured by Helium pycnometery.

Matrix modulus was calculated using the following equation:

Matrix Modulus=(small strain slope of load-displacement curve/cross-section area)*(Skeletal density of PTMPS)/density of the sample.

Airflow Measurement Using ATEQ

Airflow through PTMPS membranes were measured using ATEQ D570 at a pressure of 12 mbar with a sample port size of 2.99 cm².

Porosity Measurement Using Helium Pycnometery

Helium Pycnometery (AccuPyc 1330 Pycnometer by Micromeritics Instrument Corporation) was used to determine the true or skeletal density of the PTMPS polymer which was 1.025 g/cc (average of three measurements). Samples were die cut to form rectangular sections 9 cm by 5 cm. Each sample was weighed using a Mettler Toledo ML54 balance, and then the thickness of the samples was taken using a Miyutoyo thickness gauge (Miyutoyo Corporation, Kawasaki, Japan). Using this data, the bulk density of the sample can be calculated with the following formula:

$$\rho_{bulk} = \frac{m}{w * l * t}$$

where: $\rho_{bulk}$=bulk density (g/cc)
m=mass (g)
w=width (9 cm)
l=length (5 cm)
t=thickness (cm).

The reported results are the average of at least three calculations. Porosity was calculated as:

$$P = 100 \cdot \left[1 - \frac{\rho_{bulk}}{\rho}\right]$$

where: P=% porosity
$\rho_{bulk}$=bulk density of the sample (g/cc)
$\rho$=skeletal density.

Average Weight Average Molecular Weight by Size Exclusion Chromatography (SEC)

SEC was conducted using a Malvern OMNISEC® Reveal (Malvern PANanalytical, Westborough, MA) with Shodex columns KF-806L, KF-807L and KF-803, tetrahydrofuran (Sigma-Aldrich, GPC grade) solvent at 0.8 mL/min flow rate, and an injection volume of 100 μL at a PTMPS concentration of 2-3 mg/mL at 30° C.

Determination of Crystallinity

PTMPS crystallinity was determined using melt enthalpy from Differential Scanning calorimetry (DSC). Specifically, melt enthalpy of PTMPS was determined by integrating the DSC data, measured at a rate of 10° C./min; between 80° C. and 160° C. Crystallinity was calculated with the following formula:

$$\% \text{ Crystallinity} = 100 \times \frac{\Delta H}{\Delta Ho}$$

where ΔH (J/g) is PTMPS melt enthalpy calculated as described above and ΔHo (J/g) is the melt enthalpy of a 100% crystalline PTMPS. A value of 54 J/g was used for 100% crystalline PTMPS (taken from reference: Gardella et al, J. Am. Chem. Soc. 1983, 105, 4536-4541).

Example 1

Preparation of Purified 1,4 Bis (Hydroxydimethylsilyl) Benzene Monomer Powder Using Tetrahydrofuran 29 g of 1,4 Bis(hydroxydimethylsilyl)benzene (Gelest Inc., Tech-95, CAS Number 2754-32-7) monomer was dissolved in 125 mL of tetrahydrofuran (THF) (Sigma-Aldrich, CAS Number 109-99-9). The solution was filtered through WHATMAN® grade 52 filter paper (Sigma-Aldrich, WHA1452090: hardened, low ash) to remove large insoluble impurities. The monomer powder was recrystallized by precipitating the solution in 1600 mL of hexane (purity >=99%, Sigma-Aldrich). The recrystallized monomer powder was filtered and dried overnight under vacuum at room temperature (approximately 22° C.). The final yield of 1,4 Bis(hydroxydimethylsilyl)benzene monomer was 70 wt %.

Example 2

Preparation of Poly (Tetramethyl-p-Silphenylenesiloxane) (PTMPS) Polymer 20 g of purified 1,4 Bis(hydroxydimethylsilyl)benzene monomer powder from Example 1 was added to a 125-mL jacketed glass reactor with a polytetrafluoroethylene (PTFE) stir blade. A Dean-Stark condenser was connected to one of the outlets of the reactor to collect the water produced as a reaction byproduct. The glassware was purged with nitrogen for 4 hours. Thereafter, 106 g of anhydrous benzene (Sigma-Aldrich) was added to the reactor at room temperature (approximately 22° C.) to make a slurry with the monomer. 0.8 wt % (based on monomer weight) of tetramethylguanidinium bis-2-ethylhexanoate catalyst was added to the reactor while the reaction mixture reached reflux temperature (80° C.). The reaction was allowed to run for 4 days at reflux (80° C.). Finally, the reaction was stopped by cooling the reaction mixture to 30° C., precipitating the poly (tetramethyl-p-silphenylenesiloxane) (PTMPS) polymer in methanol (22° C.) and then dried under vacuum. The dried PTMPS polymer were characterized using size exclusion chromatography (SEC). The PTMPS polymer weight average molecular weight was determined to be 447 kilodaltons (kDa) by SEC with a polydispersity of 1.8. The melting point of the PTMPS polymer was determined to be 127° C. based on differential scanning calorimetry. Percent crystallinity of the PTMPS polymer was 68% based on the melt enthalpy from DSC.

Example 3

Preparation of PTMPS Cast Tape at 1 wt % Solution

Figure 1C:
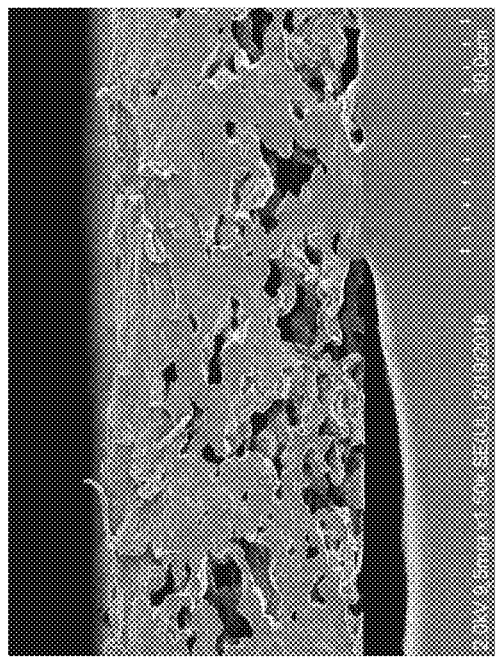
FIG. 1C is a scanning electron micrograph (SEM) of a cross-section view of the dried cast PTMPS film of Example 3 in accordance with some embodiments.
Figure 1A:
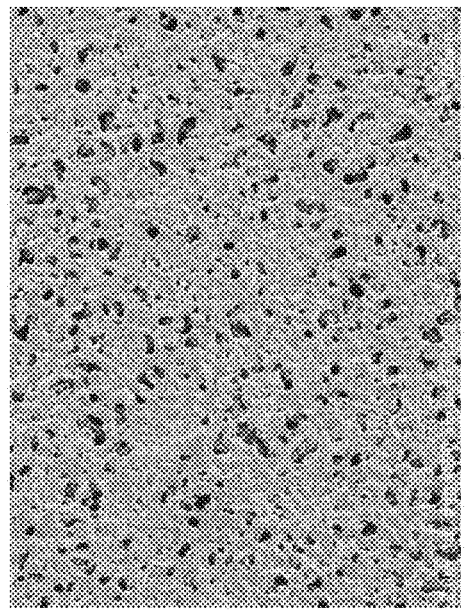
FIG. 1A is a scanning electron micrograph (SEM) of the dried cast PTMPS film of Example 3 showing a pore structure of the air side of the PTMPS film in accordance with some embodiments.
Figure 1B:
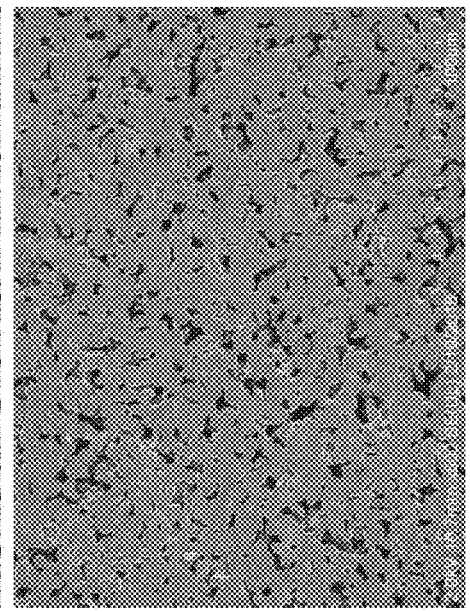
FIG. 1B is a scanning electron micrograph (SEM) of the dried cast PTMPS of Example 3 showing a pore structure on the glass side of the PTMPS film in accordance with some embodiments.

The PTMPS polymer prepared in Example 2 was dissolved in p-xylene (Sigma-Aldrich) at 75° C. to make a 1 wt % p-xylene solution. The solution was cast on a glass Petri dish and allowed to dry at approximately 22° C. The dried PTMPS cast tape was peeled from the Petri dish and further dried under vacuum at 30° C. The dried PTMPS cast tape had an average thickness of 40 μm (average of 3 readings) measured using a Mitutoyo Digimatic snap gauge (Mitutoyo America, Aurora, IL). A scanning electron micrograph (SEM) of the dried PTMPS cast tape showed a porous morphology with asymmetry in the pore structure from the air side of the tape (FIG. 1A) to the glass side (FIG. 1B) of the tape. FIG. 1C is a scanning electron micrograph of the cross-section view of the dried cast PTMPS tape. The melting point of the PTMPS tape was determined to 126° C. based on differential scanning calorimetry (DSC). Percent crystallinity of the PTMPS polymer was 67% based on melt enthalpy from DSC.

Example 4

Preparation of a Uniaxially Expanded PTMPS Membrane

Figure 2C:
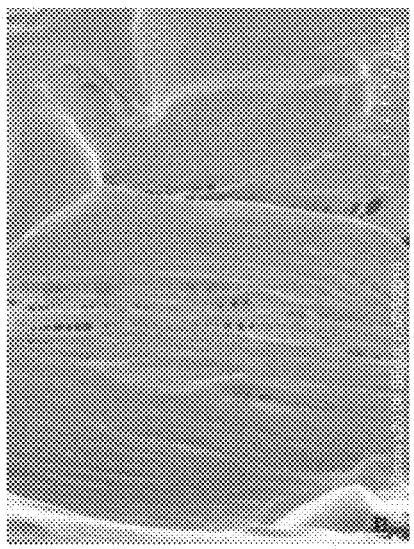
FIGS. 2B and 2C are scanning electron micrographs (SEMs) of the uniaxially stretched PTMPS membrane of Example 4 showing the presence of a microporous node and fibril microstructure on the air side of the cast PTMPS membrane in accordance with some embodiments.
Figure 2B:
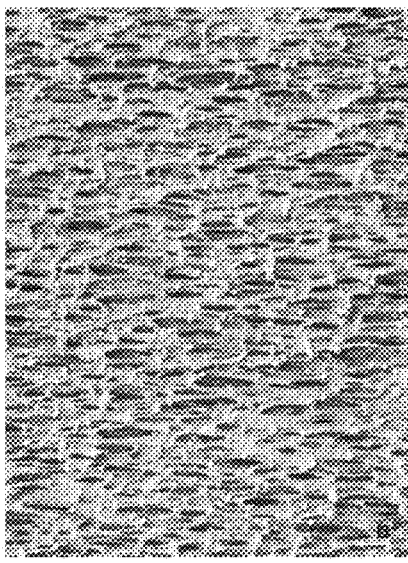
Figure 2A:
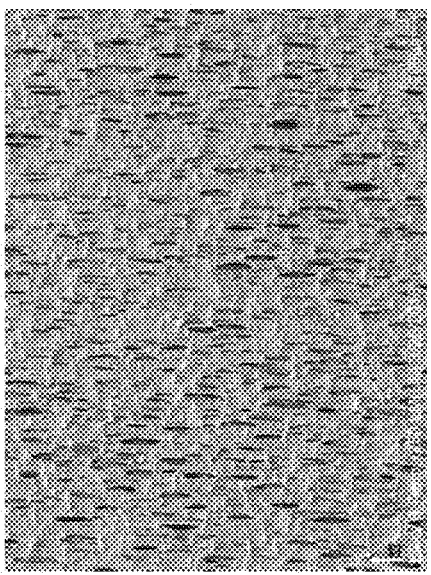
FIG. 2A is a scanning electron micrograph (SEM) of the uniaxially expanded PTMPS membrane of Example 4 showing the presence of a node and fibril microstructure on the glass side of the cast PTMPS membrane.

A 4 inch long (approximately 10.16 cm) and 1 inch wide (approximately 2.54 cm) rectangular sample from the PTMPS cast tape prepared in Example 3 was cut with a sharp razor blade and restrained between two pneumatic grips (INSTRON® 5965 tensile test machine equipped with flat-faced grips, a "1124 lb" (approximately 5 kN) load cell, and a built in convection oven (Illinois Tools Works, Norwood, MA). The restrained PTMPS cast tape was thermally equilibrated at 120° C. for 10 min at 20 mm gauge length and then uniaxially stretched at 120° C. to 5 times its original length at a rate of 1.25%/s to form a uniaxially expanded PTMPS membrane. Scanning electron micrographs of the uniaxially expanded PTMPS membrane showed the presence of a microporous node and fibril microstructure (glass side, FIG. 2A; air side, FIGS. 2B and 2C). The uniaxially expanded PTMPS membrane was asymmetric with respect to the observed pore structure from the air side to the glass side. Thermal analysis using DSC showed a shift in the melting point to a higher temperature and the presence of a broad melting point from 135° C. to 150° C., indicating a partial conversion of original lamella crystals into extended chain crystals.

Example 5

Preparation of a Biaxially Expand PTMPS Membrane

A rectangular sample 4" long (approximately 10.16 cm) and 1" wide (approximately 2.54 cm) was cut from the PTMPS cast tape prepared in Example 3 with a sharp razor blade and restrained between two pneumatic grips (INSTRON® 5965 tensile test machine with a built in convection oven). The rectangular sample of PTMPS cast tape was thermally equilibrated at 120° C. for 10 min at 20 mm gauge length and biaxially stretched at 120° C. to an area of 5 times its original area at a rate of 1%/s to form a biaxially expanded PTMPS membrane. SEM micrographs of the biaxially expanded PTMPS membrane showed the presence of a microporous, node and fibril microstructure (glass side, FIG. 3A; air side, FIGS. 3B and 3C; cross-section view, FIG. 3D). The biaxially expanded membrane was asymmetric with respect to the observed pore structure from the air side to the glass side.

Example 6

Figure 10:
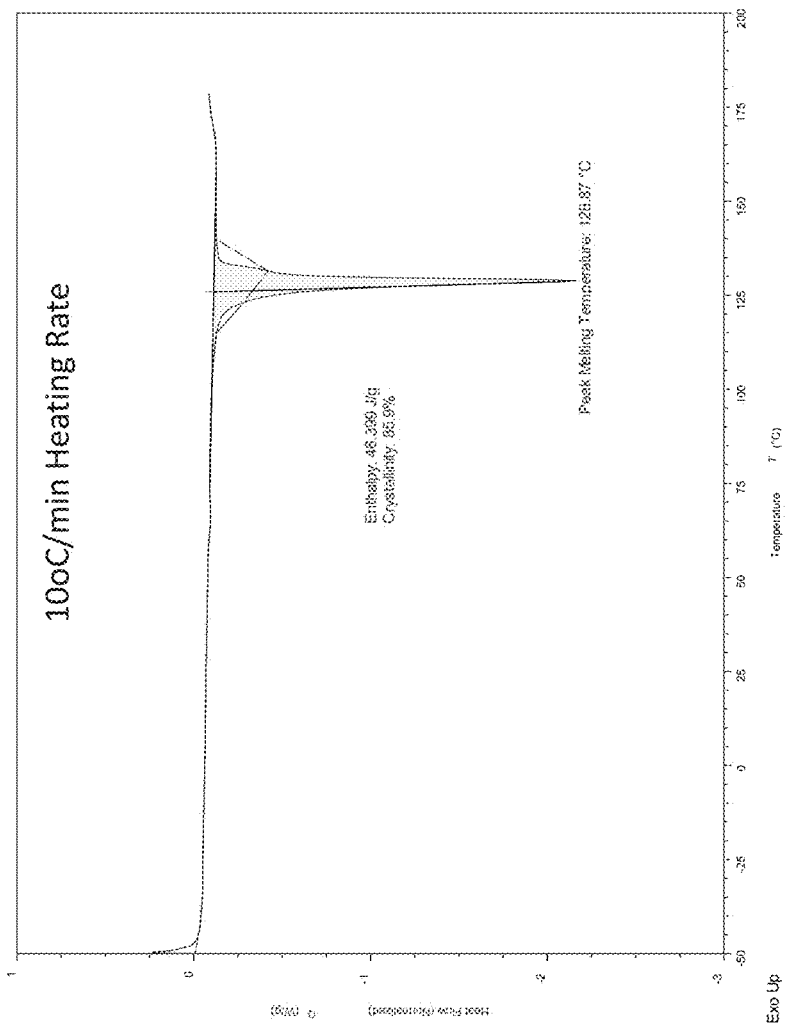
FIG. 10 is a DSC indicating the melting point of the PTMPS powder at 129° C. in accordance with some embodiments.

Preparation of PTMPS Fine Powder 2 g of PTMPS polymer as prepared in Example 2 was dissolved in 2 liters of 1,3,5-trimethyl benzene (Sigma-Aldrich) at 80° C. for 3 hours in a glass jacketed reactor fitted with a glass stir rod. The reactor was cooled to 3° C. and then maintained at 3° C. for 24 hours with gentle stirring (100 rpm). After 24 hours, crystallized particles of PTMPS were visible in the reactor. The stirrer was stopped and the PTMPS particles were filtered using a coarse filter paper (VWR Grade 315; VWR International, Radnor, PA). The wet powder was washed 5 times with excess methanol (Purity >=99%, Sigma-Aldrich) and dried at 22° C. to yield a fine powder of PTMPS. The melting point of the PTMPS fine powder was determined to be 129° C. using DSC. Percent crystallinity of the PTMPS polymer was 85% based on melt enthalpy from DSC (FIG. 10).

Example 7

Preparation of a Paste Extruded PTMPS Tape

PTMPS fine powder prepared in Example 6 was mixed with mineral oil (30 g of mineral oil to 100 g of PTMPS fine powder) in a glass jar. The PTMPS powder/mineral oil mixture contained in the glass jar was tumbled on a jar mill (U.S. Stoneware, East Palestine, OH) for 1 hour and allowed to rest for 12 hours at room temperature (approximately 22° C.). The PTMPS powder/mineral oil mixture was then thermally conditioned in a convection oven at 50° C. for 30 min. The thermally conditioned powder was poured by hand between on two co-rotating rollers moving at a linear speed of 3 feet/min (approximately 0.914 m/min). The rollers were set at 120° C. and the gap between the rollers was set at 25.4 µm resulting in a coherent PTMPS tape having a thickness of approximately 100 µm. The coherent PTMPS tape was washed in hexane (Purity >=99%, Sigma-Aldrich) to remove the mineral oil at approximately 22° C. Percent crystallinity of the PTMPS tape was 85% based on melt enthalpy from DSC.

Example 8

Preparation of an Expanded PTMPS Membrane

Figure 4:
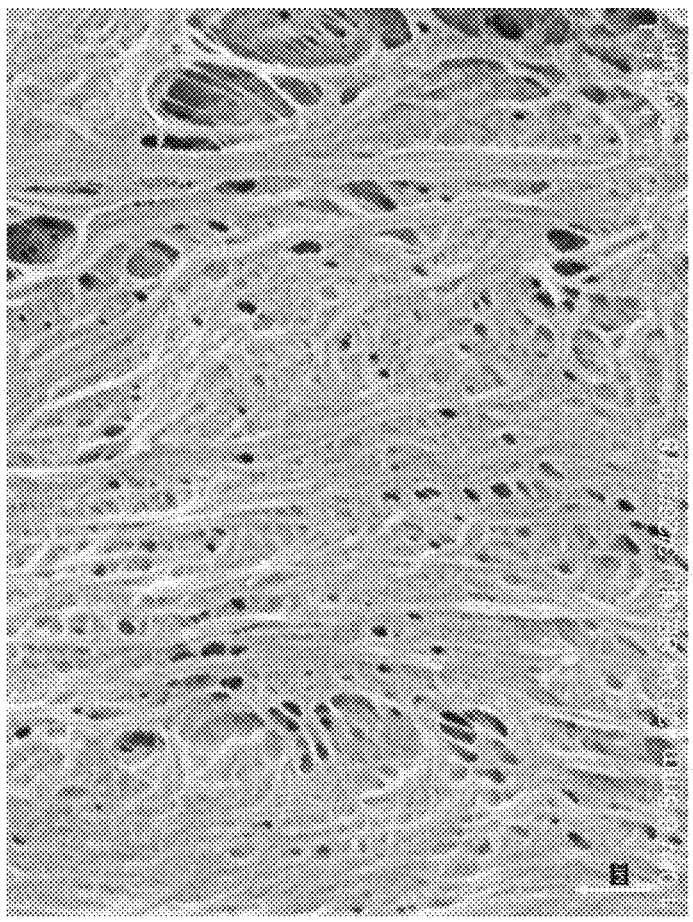
FIG. 4 is a scanning electron micrograph (SEM) of the uniaxially expanded PTMPS membrane of Example 8 showing a node and fibril microstructure in accordance with some embodiments.

A rectangular sample, 4 inch long (10.16 cm) and 1 inch wide (approximately 2.54 cm) from the coherent PTMPS tape in Example 7 was cut using a sharp razor blade and the sample was restrained between two pneumatic grips (INSTRON® 5965 tensile test machine with a built in convection oven). The restrained PTMPS tape sample was thermally equilibrated at 120° C. for 10 min at 10 mm gauge length and then expanded uniaxially to 2 times its original length at a rate of 1%/s to form a uniaxially expanded PTMPS membrane. An SEM micrograph of the expanded PTMPS membrane showed a porous, node and fibril microstructure (FIG. 4).

Example 9

Preparation of PTMPS Polymer Using Tetramethylguanidiniumbis-2-Ethylhexanoate Catalyst 16 g of purified 1,4 Bis(hydroxydimethylsilyl)benzene monomer from Example 1 was added to a 125-mL jacketed glass reactor with a PTFE stir blade. A Dean-Stark condenser was attached to one of the outlets of the reactor to collect the water produced as a reaction byproduct. The glassware was purged with nitrogen for several hours. Thereafter, 85 g of anhydrous benzene (Sigma-Aldrich) was added to the reactor at approximately 22° C. to make a slurry with the monomer. 0.84 wt % (based on the weight of the monomer powder) of tetramethylguanidiniumbis-2-ethylhexanoate catalyst (prepared as described in general methods) was added to the reactor while the reaction mixture reached reflux temperature (80° C.). The reaction was allowed to run for 3 days at reflux (80° C.). The reaction was stopped on the third day by cooling the reaction mixture to 30° C., precipitating the PTMPS polymer at room temperature (approximately 22° C.) in methanol (Sigma-Aldrich, >99%) and then drying under vacuum. The dried PTMPS polymer was characterized using size exclusion chromatography. Weight average molecular weight of the PTMPS polymer was determined to be 356 kilodaltons (kDa) with a polydispersity of 1.7.

Example 10

Preparation of a PTMPS Cast Tape-Methanol Phase Induced Separation-20 wt %

Figure 5:
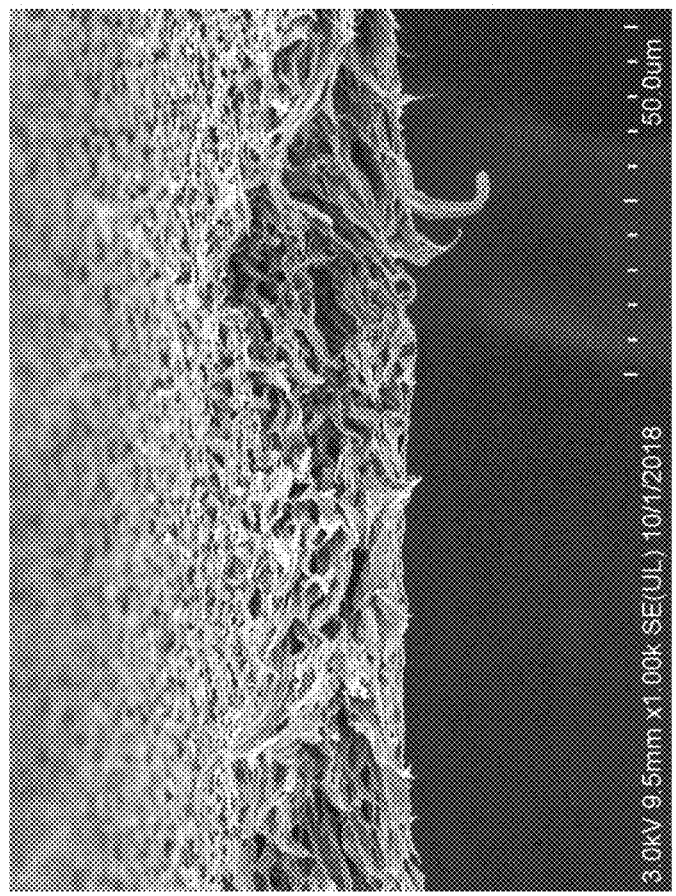
FIG. 5 is a scanning electron micrograph (SEM) of the cross-section view of the PTMPS membrane of Example 10 depicting a microporous node and fibril microstructure in accordance with some embodiments.

The PTMPS polymer prepared in Example 9 was dissolved in p-xylene (Sigma-Aldrich) to make a 20 wt % solution. The solution was coated on a glass plate using a 3 mil (approximately 76.2 µm) draw-down bar. The wet tape was immediately submerged into a methanol (Purity >99%, Sigma Aldrich) bath for solvent induced phase separation. An opaque PTMPS cast tape was peeled from the glass plate after a few minutes. The PTMPS cast tape was air dried at approximately 22° C. to remove any excess solvent. The dried, cast PTMPS tape was determined to have a thickness in the range of 25 to 30 µm. It was noted that the dried PTMPS cast tape became more transparent after application of 0.25 mL of methanol, indicating that the PTMPS cast tape was microporous (cross-section view;

FIG. 5). The matrix modulus and matrix tensile strength of the microporous PTMPS tape were determined using a Dynamic Mechanical Analyzer (DMA, TA Instruments). The PTMPS cast tape was determined to have a matrix modulus of 212 MPa and a matrix tensile strength of 6.5 MPa. The PTMPS cast tape was determined to have a porosity of 35% via Helium pyconometry (Micromeritics AccuPyc 1330; Micromeritics Instrument Corp., Norcross, GA). Percent crystallinity of the PTMPS tape was 71% based on melt enthalpy from DSC.

Example 11

Preparation of Purified 1,4 Bis (Hydroxy Dimethyl Silyl) Benzene Monomer Using Dichloromethane 25 g of 1,4 bis(hydroxy dimethyl silyl) benzene monomer (Gelest Inc., Tech-95) was dissolved in 936 mL of dichloromethane (DCM, Sigma Aldrich) to prepare a clear solution. The solution was filtered through WHATMAN® grade 52 filter paper to remove large insoluble impurities. The 1,4 bis(hydroxy dimethyl silyl) benzene monomer was recrystallized from the filtered solution by refrigerating the solution at −3° C. overnight. The recrystallized 1,4 bis(hydroxy dimethyl silyl) benzene monomer powder was filtered using a coarse filter paper (VWR Grade 315) and dried under vacuum for 6 hours (at 30° C.). The final yield of the 1,4 bis(hydroxy dimethyl silyl) benzene monomer powder was 70 wt %.

Example 12

Preparation of PTMPS Powder Using 1,1,3,3-Tetramethylguanidine Catalyst 9 g of purified 1,4 bis(hydroxy dimethyl silyl) benzene monomer from Example 11 was added to a 125 ml jacketed glass reactor with a PTFE stir blade. A Dean-Stark condenser was attached to one of the outlets of the reactor to collect the water produced as a reaction byproduct. The entire reactor setup was placed in a nitrogen glove box. Thereafter, 40 g of anhydrous toluene (Sigma-Aldrich) was added to the reactor at room temperature (approximately 22° C.) to make a slurry. 0.24 g of 1,1,3,3-tetramethylguanidine (Sigma-Aldrich, 99%, catalog 241768-100ML) catalyst was added to the reactor while the reaction mixture reached reflux temperature (115° C.). The reaction was allowed to run for 7 days at reflux (115° C.). Finally, the reaction was stopped by cooling the reaction mixture to 30° C. The PTMPS polymer was precipitated into room temperature (approximately 22° C.) methanol and then dried under vacuum. The dried PTMPS polymer was characterized using size exclusion chromatography (SEC). The weight average molecular weight of the PTMPS polymer was determined to be 1 million dalton (1 MDa) with a polydispersity of 2.

Example 13

Preparation of PTMPS Cast Tape Using Methanol for Phase Induced Separation—10 wt %

The PTMPS polymer prepared in Example 12 was dissolved in p-xylene (Sigma-Aldrich) to make a 10 wt % solution. The solution was coated on a glass plate using a 3 mil (approximately 76.2 μm) draw-down bar. The wet tape was immediately submerged into a methanol (Sigma-Aldrich) bath at 22° C. for solvent induced phase separation. An opaque PTMPS cast tape was peeled from the glass plate after a few minutes. The PTMPS cast tape was allowed to dry in air (approximately 22° C.) to obtain a thickness of 17 μm. It was noted that the dried PTMPS cast tape became more transparent after application of a 0.25 mL of methanol, indicating that the PTMPS cast tape was microporous. The porosity of the PTMPS cast tape was 34% as determined by Helium pyconometry (Micromeritics Accupyc 1330).

Example 14

Preparation of PTMPS Cast Tape Using Isopropanol for Phase Induced Separation—10 wt %

The PTMPS polymer prepared in Example 12 was dissolved in p-xylene (Sigma-Aldrich) to make a 10 wt % solution. The solution was coated on a glass plate using a 3 mil (approximately 76.2 μm) draw-down bar. The wet tape was immediately submerged into isopropanol (IPA) (Purity >=99%, Sigma-Aldrich) bath at 22° C. for solvent induced phase separation of the PTMPS cast tape. An opaque PTMPS cast tape was peeled from the glass plate after 10 minutes. The PTMPS cast tape was allowed to dry in air (approximately 22° C.) to obtain a thickness of 30 μm. The dried PTMPS cast tape became more transparent after application of 0.25 mL of methanol, indicating that the PTMPS cast tape was microporous. The porosity of the PTMPS cast tape was 67% as determined by helium pyconometry (Micromeritics Accupyc 1330).

Example 15

Preparation of PTMPS Cast Tape Using Isopropanol for Phase Induced Separation—7 wt %

The PTMPS polymer prepared in Example 12 was dissolved in p-xylene to make a 7 wt % solution. The solution was coated on a glass plate using a 3 mil (approximately 76.2 μm) draw-down bar. The wet tape was immediately submerged into isopropanol (IPA) (Sigma-Aldrich) bath for solvent induced phase separation of the PTMPS cast tape. An opaque PTMPS tape was peeled from the glass plate after 10 minutes. The PTMPS cast tape was allowed to dry in air (approximately 22° C.) to obtain a thickness of 20 μm. The dried PTMPS cast tape became more transparent after application of 0.25 mL of methanol, indicating that the PTMPS cast tape was microporous. The porosity of the PTMPS cast tape was 44% as determined by helium pyconometry.

Example 16

Preparation of an Expanded PTMPS Membrane

Figure 6:
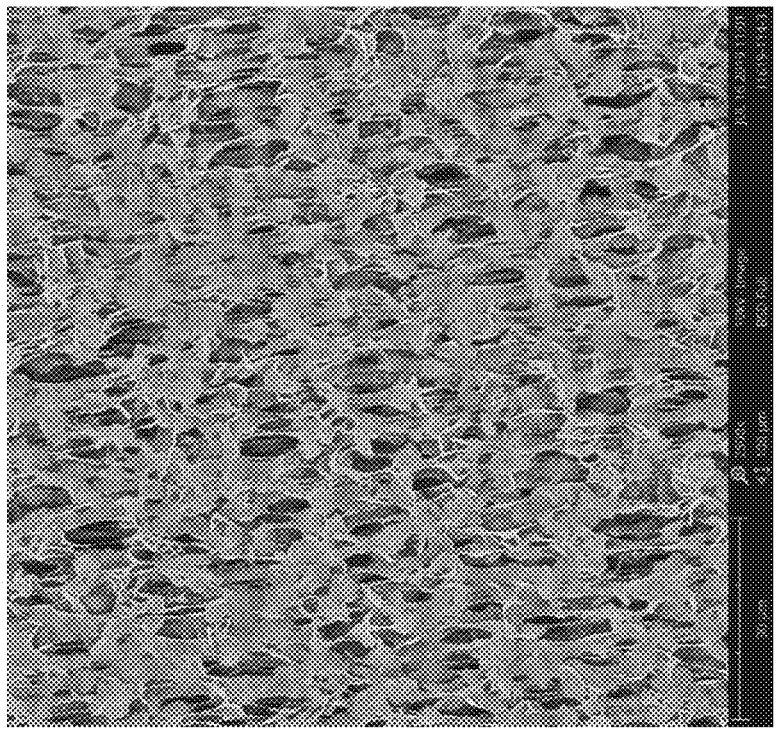
FIG. 6 is a scanning electron micrograph (SEM) of the expanded PTMPS membrane of Example 16 showing a porous, node and fibril microstructure in accordance with some embodiments.

A rectangular sample, 4" long (approximately 10.16 cm) and 1" wide (approximately 2.54 cm) was cut from the PTMPS cast tape as prepared in Example 14 using a sharp razor blade. The PTMPS tape sample was restrained between two pneumatic grips (INSTRON® 5965 tensile test machine with a built in convection oven). The restrained tape was thermally equilibrated at 120° C. for 10 min at 20 mm gauge length and then expanded uniaxially to 2 times its original length at a rate of 10%/s to form an expanded PTMPS membrane. An SEM micrograph of the expanded PTMPS membrane showed it contained a porous, node and fibril microstructure (FIG. 6). The expanded PTMPS membrane became more transparent after application of 0.25 mL of methanol (which indicated that the expanded PTMPS membrane was microporous). The porosity of the expanded PTMPS membrane was 87% as determined by helium pyconometry. The modulus and matrix tensile strength of the microporous PTMPS membrane were determined using a Dynamic Mechanical Analyzer (DMA, TA Instruments). The expanded PTMPS membrane had a modulus of 278 MPa and an matrix tensile strength of 5 MPa.

Example 17

Preparation of an Expanded PTMPS Membrane from a Pressed Membrane

Figure 7:
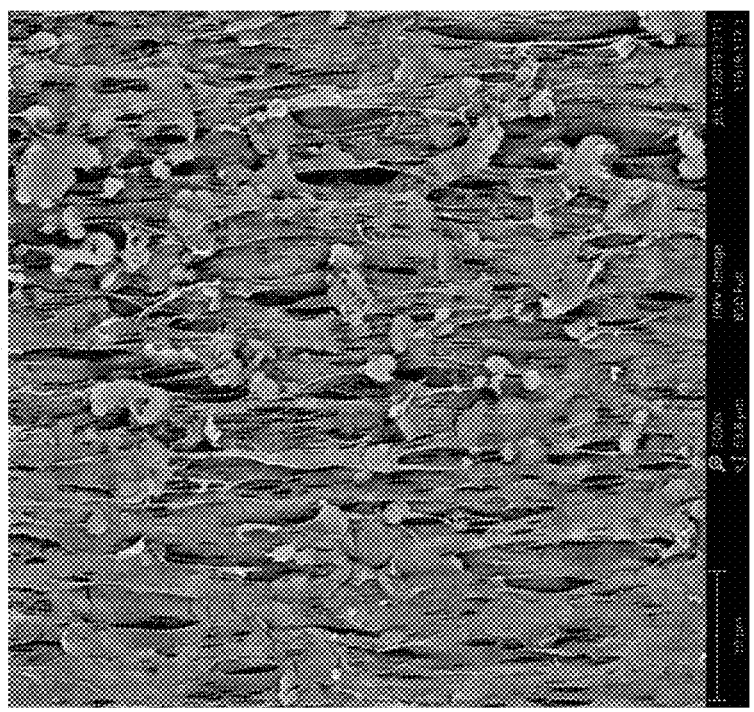
FIG. 7 is a scanning electron micrograph of the expanded PTMPS membrane of Example 17 showing a porous, node and fibril microstructure.

A rectangular sample from the PTMPS cast tape as prepared in Example 14 having a size of 76 mm long and 60 mm wide, was cut using a sharp razor blade and pressed between KAPTON® films (a polyimide film commercially available from DuPont de Nemours Inc., Wilmington, DE) and covered with polished steel plates of the same dimensions on a hot press (Pasadena Hydraulics Inc., City of Industry, CA) at 80° C. with a pressure of 100 psi (approximately 689 kPa) for 5 min. A 30 mm long and 24 mm wide sample was cut using a sharp razor blade from the pressed PTMPS cast tape and restrained between two pneumatic grips (INSTRON® 5965 tensile test machine with a built in convection oven). The restrained PTMPS cast tape was thermally equilibrated at 120° C. for 10 min at 20 mm gauge length and then expanded uniaxially at 120° C. to 3.75 times its original length at a rate of 10%/s to form an expanded PTMPS membrane. An SEM micrograph of the expanded PTMPS membrane showed that the expanded PTMPS membrane had a porous, node and fibril microstructure (FIG. 7). The expanded PTMPS membrane having a node and fibril microstructure became more transparent after application of 0.25 mL of methanol, indicating that the expanded PTMPS membrane was microporous. The porosity of the expanded PTMPS membrane was 60% as determined by helium pyconometry. The modulus and matrix tensile strength of the microporous film were determined using a Dynamic Mechanical Analyzer (DMA, TA Instruments) in both the machine (along the uniaxial expansion direction) and transverse (perpendicular to the uniaxial expansion direction) direction. The microporous PTMPS membrane had a matrix modulus of 795 MPa and a matrix tensile strength of 33 MPa along the machine direction and a matrix modulus of 164 MPa and a matrix tensile strength of 4 MPa along the transverse direction.

Example 18

Preparation of a Biaxially Expanded PTMPS Membrane

PTMPS polymer was polymerized using the method outlined in Example 12. The weight average molecular weight of the PTMPS polymer was determined to be 650 (kDa) with a polydispersity of 1.5. The PTMPS polymer was then dissolved in p-xylene to make a 10 wt % solution. The solution was coated on a glass plate using a 10 mil (approximately 254 µm) draw-down bar to form a cast film. The wet tape was immediately submerged into an isopropanol (IPA) (Sigma-Aldrich) bath for solvent induced phase separation of the PTMPS cast tape.

Figure 8:
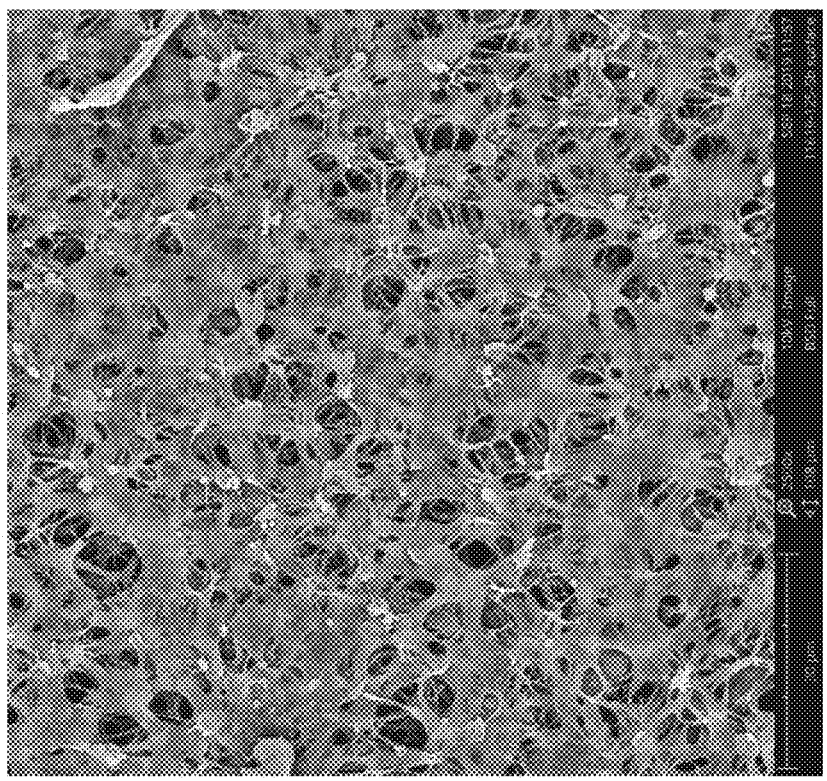
FIG. 8 is a scanning electron micrograph (SEM) of the biaxially expanded PTMPS membrane of Example 18 showing a porous, node and fibril microstructure in accordance with some embodiments.
Figure 12:
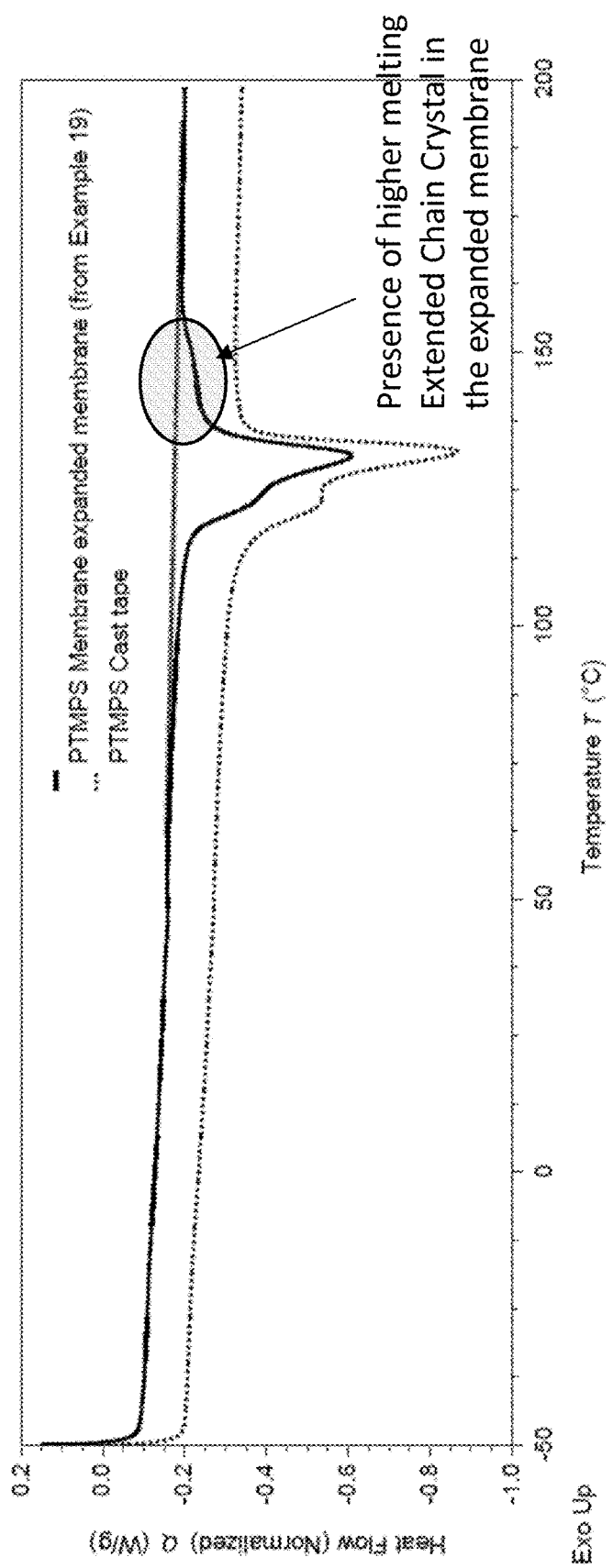
FIG. 12 is a DSC depicting extended chain crystals associated with the fibrils.

An opaque PTMPS tape was peeled from the glass plate after 10 minutes. The PTMPS cast tape was allowed to dry in air (approximately 22° C.) to obtain a thickness of 146 µm. Airflow through the PTMPS cast tape was measured using ATEQ D570 and determined to be 2.2 L/hr. A rectangular sample, 3.2 inches long (approximately 8.1 cm) and 2.8 inches wide (approximately 7.2 cm) was cut from the PTMPS cast tape using a sharp razor blade and the PTMPS tape sample was restrained between two pneumatic grips (INSTRON® 5965 tensile test equipped with a built-in convection oven). The restrained PTMPS cast tape was thermally equilibrated at 111° C. for 5 min and then expanded uniaxially to 3 times its original length at a rate of 100%/s with an initial gauge length of 20 mm to form an expanded PTMPS membrane. The expanded direction is designated as the machine direction (MD) and the direction 90° to MD is designated as the transverse direction (TD). The expanded PTMPS membrane was taken out of the grips, rotated 90°, and restrained again between the two pneumatic grips such that the TD was along the travel direction of the grips. The restrained PTMPS membrane was thermally equilibrated at 111° C. for 5 min and then expanded uniaxially to 2 times its original length at a rate of 100%/s with an initial gauge length of 20 mm to give a biaxially expanded PTMPS membrane. An SEM micrograph of the biaxially expanded PTMPS membrane showed a porous, node and fibril microstructure (FIG. 8). In addition, FIG. 12 depicts a DSC curve that indicates presence of higher melting extended chain crystals composing the fibrils. Airflow through the biaxially expanded PTMPS membrane was measured using ATEQ D570 and was determined to be 45.3 L/hr.

Example 19

Preparation of a Simultaneously Biaxially Expanded PTMPS Membrane

PTMPS polymer was polymerized using the method outlined in Example 12. The weight average molecular weight of the PTMPS polymer was determined to be 550 (kDa) with a polydispersity of 1.7. The PTMPS polymer was dissolved in p-xylene to make a 10 wt % solution. The PTMPS polymer solution was coated on a glass plate using a 10 mil (approximately 254 µm) draw-down bar to form a cast film. The wet tape was immediately submerged into an isopropanol (IPA) (Sigma-Aldrich) bath for solvent induced phase separation of the PTMPS cast tape.

Figure 11:
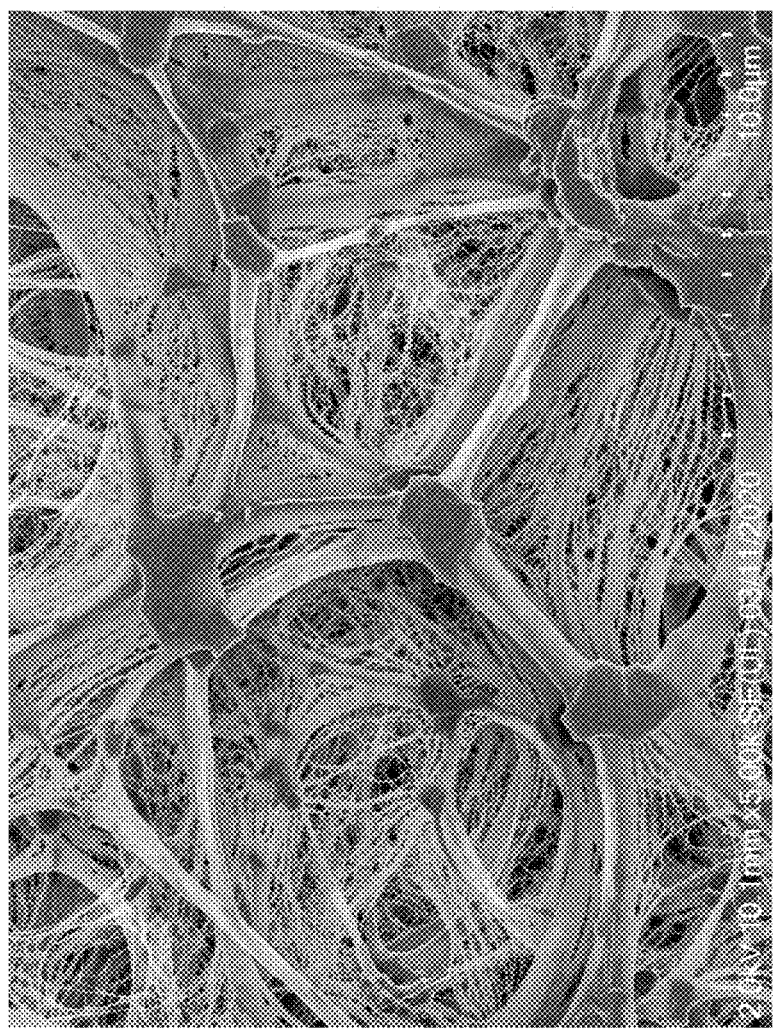
FIG. 11 is an SEM of a simultaneously biaxially expanded PTMPS membrane.

An opaque PTMPS tape was peeled from the glass plate after 10 minutes. The PTMPS cast tape was allowed to dry in air (approximately 22° C.). The dried PTMPS cast tape was pressed between KAPTON® films (a polyimide film commercially available from DuPont de Nemours Inc., Wilmington, DE) and covered with polished steel plates of the same dimensions on a hot press (Pasadena Hydraulics Inc., City of Industry, CA) at 80° C. with a pressure of 10 psi (approximately 68.9 kPa) for 5 min. The final thickness of the PTMPS cast tape was 110 µm. The pressed PTMPS cast tape was then loaded into a Karo IV biaxial expansion machine (commercially available from Brückner Group, GmbH) and thermally equilibrated at 120° C. for 3 min before simultaneously biaxially expanding the PTMPS cast tape at 10%/s until it reached an area ratio of 9. An SEM micrograph of the simultaneously biaxially expanded PTMPS membrane showed a porous, node and fibril microstructure (FIG. 11). The porosity of the simultaneously biaxially expanded PTMPS membrane was 84% as determined by helium pyconometry. The modulus and matrix tensile strength of the porous, simultaneously biaxially expanded PTMPS membrane were each determined using a Dynamic Mechanical Analyzer (DMA, TA Instruments). The simultaneously biaxially expanded PTMPS membrane had a modulus of 187 MPa and a matrix tensile strength of 9.6 MPa.

Example 20

Paste Extrusion of PTMPS Fine Powder into a Bead

PTMPS polymer was polymerized using the method outlined in Example 12. The weight average molecular weight of the PTMPS polymer was determined to be 680 (kDa) with a polydispersity of 1.6. The PTMPS polymer was dissolved in Dichloromethane (Sigma Aldrich Purity >99.5%) to make a 5 wt % solution. The PTMPS solution was added to a water-surfactant solution in equal parts by weight in a plastic container. The mixture was emulsified using an IKA T50 Basic homogenizer (IKA®-Works, Inc., Wilmington, NC) at 10,000 rpm, for 10 mins at 25° C. The emulsion was then transferred into a 250 mL glass jacketed reactor and the Dichloromethane was removed from the emulsion by gently stirring at 25° C. to yield particles of PTMPS in water. The PTMPS particles were precipitated from the water phase by the addition of a salt and washed five times with equal volumes of water to remove excess surfactant and salt. Finally, the PTMPS particles were filtered from the water with a coarse filter paper (VWR Grade 315) and dried under vacuum for 24 hours at 30° C. to yield PTMPS fine powder.

The PTMPS fine powder was mixed with Isopar™ V oil (Exxon Mobile Chemicals) (30 g of oil to 100 g of PTMPS fine powder) in a glass jar. The PTMPS powder/oil mixture contained in the glass jar was tumbled on a jar mill (U.S. Stoneware, East Palestine, OH) for 1 hour and was allowed to rest for 12 hours at room temperature (approximately 22° C.). The PTMPS powder/oil mixture was then thermally conditioned in a convection oven at 50° C. for 30 min. The PTMPS powder/oil mixture was poured into an Aluminum cylindrical cavity with a 9:1 reduction die at the outlet and equilibrated for 5 mins at 123° C. The powder/oil mixture was paste extruded at 1 mm/s through the 9:1 reduction die to form a coherent PTMPS cylindrical bead.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. An article comprising:
an expanded poly (tetramethyl-p-silphenylenesiloxane) polymer membrane having a melting point from about 130° C. to about 150° C. and a microstructure of nodes interconnected by fibrils, wherein the expanded poly (tetramethyl-p-silphenylenesiloxane) polymer membrane has a porosity greater than about 30%.

2. The article according to claim 1, wherein the poly (tetramethyl-p-silphenylenesiloxane) polymer has a crystallinity of at least 70%.

3. The article according to claim 1, wherein the expanded poly (tetramethyl-p-silphenylenesiloxane) polymer membrane further comprises a matrix tensile strength in at least one direction from about 1 MPa to about 50 MPa.

4. The article according to claim 1, wherein the expanded poly (tetramethyl-p-silphenylenesiloxane) polymer membrane has a matrix modulus in at least one direction from about 100 MPa to about 1000 MPa.

5. The article according to claim 1, wherein the expanded poly (tetramethyl-p-silphenylenesiloxane) polymer membrane comprises a poly (tetramethyl-p-silphenylenesiloxane) polymer having a weight average molecular weight from about 350 kDa to 5 MDa.

6. The article according to claim 1, wherein the poly (tetramethyl-p-silphenylenesiloxane) polymer has a polydispersity from 1 to 5.

7. The article according to claim 1, wherein the expanded poly (tetramethyl-p-silphenylenesiloxane) polymer membrane further comprises at least one comonomer in an amount from about 0.001 mol % to about 10 mol %.

8. The article according to claim 1, wherein the expanded poly (tetramethyl-p-silphenylenesiloxane) polymer membrane comprises at least one filler material.

9. The article according to claim 1, wherein the expanded poly (tetramethyl-p-silphenylenesiloxane) polymer membrane contains therein bioactive moieties.

10. The article according to claim 1, wherein the expanded poly (tetramethyl-p-silpbnenylenesiloxane) polymer membrane has an asymmetry in pore size from a first side to a second side thereof.

11. The article according to claim 1, wherein the fibrils comprise polymer chains and the polymer chains are oriented along a fibril axis.

12. The article according to claim 1, wherein the fibrils each contain extended chain crystals.

13. The article according to claim 1, wherein the poly (tetramethyl-p-silphenylenesiloxane) polymer article is in the form of a fiber, tube, tape, sheet, or a three dimensional self-supporting structure.

14. A composite comprising the poly (tetramethyl-p-silphenylenesiloxane) article according to claim 1.

15. A laminate comprising the poly (tetramethyl-p-silphenylenesiloxane) polymer article according to claim 1.

16. A device comprising the porous poly (tetramethyl-p-silphenylenesiloxane) polymer article according to claim 1.

17. An article comprising:
an expanded poly (tetramethyl-p-silphenylenesiloxane) polymer membrane having a melting point from about 130° C. to about 150° C. and a microstructure of nodes interconnected by fibrils wherein the expanded poly (tetramethyl-p-silphenylenesiloxane) polymer membrane has an asymmetry in pore size from a first side to a second side thereof.

* * * * *